United States Patent
Ribes Marti

(10) Patent No.: US 8,474,111 B2
(45) Date of Patent: Jul. 2, 2013

(54) PANEL-FASTENING CLIPS, ESPECIALLY FOR CURTAIN OR LATERAL AIRBAGS

(75) Inventor: Oscar Ribes Marti, Barcelona (ES)

(73) Assignee: ITW Metal Fasteners, S.L., Barcelona (ES)

( * ) Notice: Subject to any disclaimer, the term of this patent is extended or adjusted under 35 U.S.C. 154(b) by 23 days.

(21) Appl. No.: 13/129,440

(22) PCT Filed: Nov. 12, 2009

(86) PCT No.: PCT/IB2009/055046
§ 371 (c)(1),
(2), (4) Date: May 16, 2011

(87) PCT Pub. No.: WO2010/055485
PCT Pub. Date: May 20, 2010

(65) Prior Publication Data
US 2011/0232049 A1   Sep. 29, 2011

(30) Foreign Application Priority Data
Nov. 17, 2008   (ES) .................................. 200803332

(51) Int. Cl.
*F16B 5/06* (2006.01)
*F16B 37/04* (2006.01)
*B60R 21/213* (2011.01)

(52) U.S. Cl.
USPC .................. 24/458; 24/292; 24/293; 24/294; 24/295; 24/581.11; 411/508; 411/527

(58) Field of Classification Search
USPC ............... 24/292, 293, 294, 295, 581.11, 458
See application file for complete search history.

(56) References Cited

U.S. PATENT DOCUMENTS

| 1,959,096 | A | * | 5/1934 | Fernberg | 24/295 |
| 2,180,925 | A | * | 11/1939 | Dyresen | 52/716.7 |
| 3,034,615 | A | * | 5/1962 | Kern | 24/292 |
| 3,205,546 | A | * | 9/1965 | Nelson | 24/292 |
| 3,310,929 | A | * | 3/1967 | Garvey | 24/295 |
| 3,864,789 | A | * | 2/1975 | Leitner | 24/293 |

(Continued)

FOREIGN PATENT DOCUMENTS

| DE | 102006019256 A1 | 10/2007 |
| EP | 1138962 A2 | 10/2001 |
| GB | 2162272 A | 1/1986 |

OTHER PUBLICATIONS

ISR for PCT/IB2009/055046 dated Feb. 22, 2010.

*Primary Examiner* — Robert J Sandy
*Assistant Examiner* — Caroline L Natirboff
(74) *Attorney, Agent, or Firm* — Lowe Hauptman Ham & Berner, LLP

(57) ABSTRACT

Improvements to panel fastening clips, especially to those used in curtain and/or lateral airbags, of the kinds of clips that are formed by a surface and/or several flexing arms that are designed to be located in the outer part of the panel into whose opening they are inserted, including several feet that are more or less elastic and that tend to converge at their ends in the general shape of an inverted "V" in the direction in which the clip is inserted, as well as several wings whose ends work against the lower surface of said panel and which ensure that said clip is fastened to said panel, characterized by the fact that the ends of said wings have an enlarged working surface against the lower surface of said panel.

13 Claims, 3 Drawing Sheets

U.S. PATENT DOCUMENTS

| | | |
|---|---|---|
| 4,610,588 A | 9/1986 | Van Buren, Jr. et al. |
| 4,630,338 A * | 12/1986 | Osterland et al. ............... 24/293 |
| 5,759,004 A * | 6/1998 | Kuffel ........................... 411/508 |
| 6,095,734 A | 8/2000 | Postadan et al. |
| 6,868,588 B2 * | 3/2005 | Dickinson et al. ............. 24/295 |
| 7,086,125 B2 * | 8/2006 | Slobodecki et al. ............ 24/295 |
| 7,165,371 B2 * | 1/2007 | Yoyasu ........................ 52/716.5 |
| 7,267,361 B2 * | 9/2007 | Hofmann et al. .......... 280/728.2 |
| 2001/0025404 A1 * | 10/2001 | Wright ............................ 24/662 |
| 2006/0168773 A1 * | 8/2006 | Smith et al. .................... 24/295 |
| 2006/0288543 A1 * | 12/2006 | Lubera et al. ................... 24/295 |

* cited by examiner

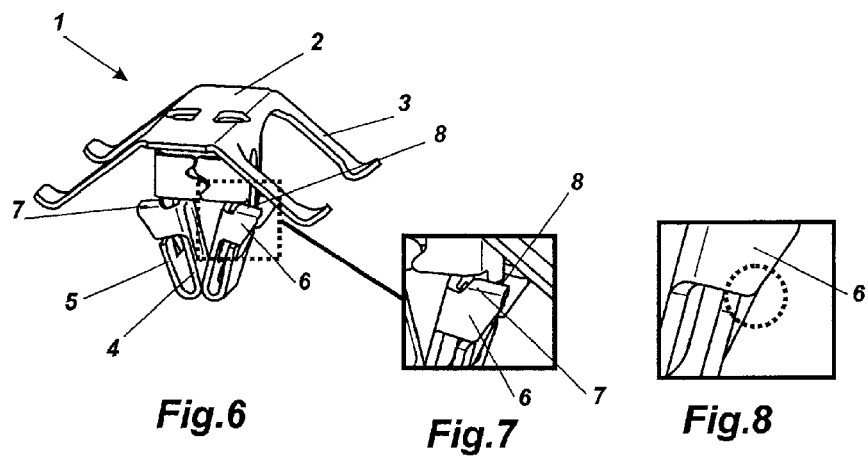
*Fig.6*  *Fig.7*  *Fig.8*
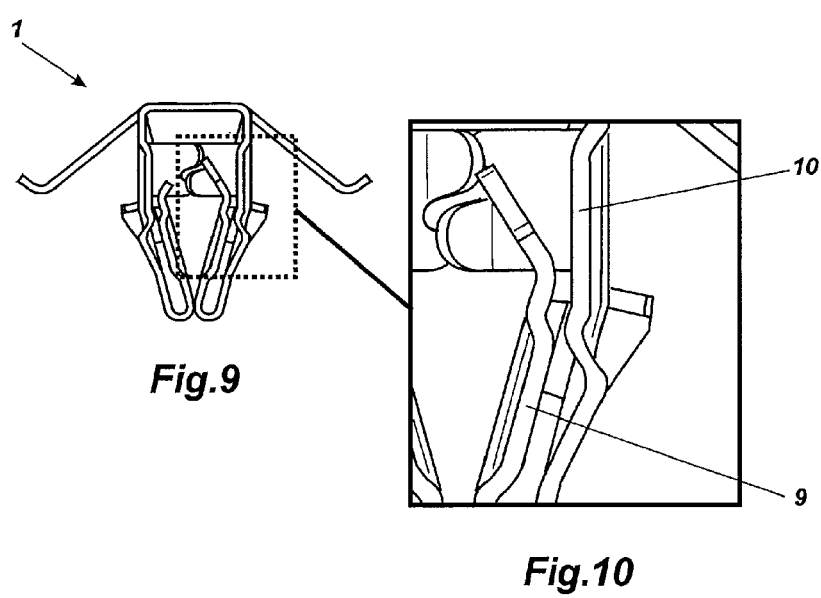
*Fig.9*  *Fig.10*

PANEL-FASTENING CLIPS, ESPECIALLY FOR CURTAIN OR LATERAL AIRBAGS

RELATED APPLICATIONS

The present application is national phase of PCT/IB2009/055046 filed Nov. 12, 2009 and claims priority from Spanish Application Number P 200803332, filed Nov. 17, 2008.

SCOPE

Airbags are currently an essential element of passive safety in vehicles and are routinely incorporated into the manufacture thereof. The tests to which the vehicles have been subjected, as well as mortality statistics, have demonstrated that the use of airbags can improve the safety of automobile occupants considerably and, when combined with other forms of passive safety, such as seat belts, significantly (by about 30%) reduce mortality in the case of serious accidents.

Manufacturers produce frontal airbags, which are designed to protect the driver and/or passenger in the event of a head-on collision and, considering their positions, lateral airbags are made as well that are installed behind the posts and/or in the sides of the vehicle seats, along with curtain airbags. Airbags of the curtain type are usually located in the part close to the roof on the sides of the automobile, situated above the front and rear doors, and by their very nature have very rigorous requirements as regards the goals set for them and the technical challenges that they pose: their location in the vehicle and the way they are fastened, deployment time, the time that the airbag remains inflated, etc. This is mainly due to the fact that there is only a short distance between the body and the occupant and that there is little vehicle material between the occupant and an impacting vehicle. In addition, they should remain inflated for a longer time due to the fact the danger of forward motion lasts longer, for example the forward motion by the upper part of the body.

Unlike frontal airbags, which are normally manufactured with a balloon that is stored in the casing of the steering wheel or steering column or, in the case of the passenger, in the dashboard itself, whereby a box is used for this purpose, curtain airbags usually use a rolled-up and folded strip that is stored in a small lateral space close to the automobile roof. Hidden behind the narrow panel of the vehicle, their inflation time is approximately 25 ms.

These curtain-airbag mechanisms are fastened to the panels of the vehicle by means of several clips that secure them to the vehicle body. These clips are generally composed of several flexing arms that extend beyond the panel and that keep the clip-panel assembly under tension, also of several feet that together generally form an inverted "V" to make it easier to insert them into the hole in the panel, and retaining wings that are associated with the foregoing and that at the bottom fasten the panel by its opposite or inside wall to the insertion hole.

The state of the art provides different means of producing these kinds of clips, with different structural details associated with each embodiment. In the most general case, various clips are needed in order to fasten the curtain airbag to the body of the vehicle.

Since the airbag deploys in a few thousands of a second, reaching an expansion speed that is approximately equivalent to 300 km/hr, the forces involved in the firing of the airbag are enormous and act on the support elements of the mechanism and thus on the fastening clips of the airbags. The shaking involved in the expansion of the airbag exerts a heavy outward traction force on the panel that acts directly on the above-mentioned clips, which, however, must withstand it without damaging the ball/curtain or the panel to which they are attached.

Today, airbags are parts that are still expensive and difficult to install and/or replace once they are deployed. Therefore, one of the objects of this invention is to provide an airbag clip that is easy to install and remove in the event it needs to be maintained or repaired, thereby decreasing the time and reducing the cost for the installation of the airbag.

The goal of the invention is essentially to improve the operational efficiency of the clips for airbags and especially for curtain-type airbags, although the invention is not limited to the latter and can be used for any kind of clip that works in a similar fashion.

It has been found that, once the firing of the airbag occurs, the known clips undergo deformation at their feet, which tend to bend, thereby altering the direction of the locking surfaces of the clip and sometimes damaging the clip irreversibly and in other cases locking it.

In addition to the drawbacks that this invention is intended to remedy, the invention relates to the fastening wings of this kind of clip. The force with which the airbag expands and releases creates an enormous amount of traction on these wings against the lower surface of the panel, which leads to an irreversible cutting of the panel, referred to as the "knife effect"; this effect is manifested as permanent and irreparable damage to the vehicle body that makes it impossible to replace the airbag mechanism in the event that it fires.

These and other advantages of the invention will be made clear during the description of said invention.

BRIEF DESCRIPTION OF THE INVENTION

This invention makes reference to some improvements that are made to the design of the fastening clips and especially to the clips that are used in vehicle airbags, for example of the curtain type that are located in the lateral areas close to the interior roof of the vehicle.

In their conventional design, these kinds of fastening clips for vehicle panels have several flanges which, attached to the airbag, are located in the upper part of the panel in the direction in which the clip is inserted, several more or less elastic feet that are in the general shape of an inverted "V", which make it easier to insert them into the panel opening, and several wings which, attached to these feet, work against the lower face of the panel and make it possible to fasten the clip. As regards this invention, no further details of these clips will be given.

When the airbag is activated, the clip is subjected to a great deal of traction force that tends to pull it out and that is opposed by the wings, which act against the surface of the panel. To deal with the so-called "knife effect", these wings divide among themselves the material of the panel and they are designed to terminate in a section fold in the shape of an "L", thereby increasing its surface of attack on the panel.

In addition, the feet and wings of the clip are reinforced by deformations and ribs therein that tend to increase their structural strength and to oppose the undesirable folding thereof that is caused by the above-mentioned traction forces when the airbag is activated.

This design achieves the goals set by the invention.

BRIEF DESCRIPTION OF THE DRAWINGS

To make the invention easier to understand, a sheet of drawings is attached, which is merely illustrative in nature and does not limit the invention.

FIG. 6 is a representation in perspective view of a practical embodiment of the invention with regard to a clip that is intended to be used with airbag devices.

FIGS. 7 and 8 show details of the clip depicted in the previous figure. Specifically, FIG. 7 shows the expanded support surface of the clip wings that is characteristic of the invention, while FIG. 8 shows a favorable effect that results from the improvements made by this invention and that tends to keep the wings of the clip from being able, due to manufacturing tolerances, to move outward and to interfere with the edge of the panel opening while it is being installed therein.

FIG. 9 shows a front view of a possible practical embodiment of the invention that is similar to those in FIGS. 6-8, but in this case the feet and wings of the clip are fitted with structural-reinforcement ribs.

FIG. 10 shows an enlarged detail of the previous figure.

DETAILED EXPLANATION OF THE INVENTION

Figure 1:
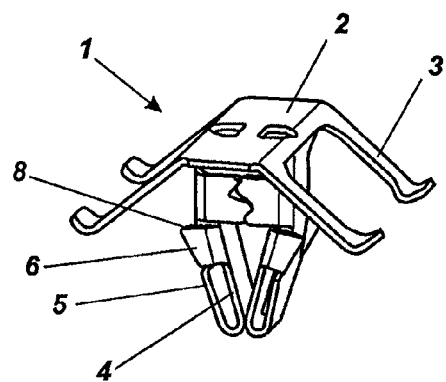
FIG. 1 is a schematic representation in perspective view of a clip according to the state of the art in which the parts that are present in the invention and in this kind of clip are defined.

This invention consists of several improvements to panel fastening clips, especially those used in curtain and/or lateral airbags, whereby said clips (1) are formed by a surface (2) and/or several flexing arms (3) that are designed to be located in the outer part of the panel into whose opening the clip is inserted; this includes several feet (4) that are more or less elastic and that tend to converge at their ends and have the general shape of an inverted "V" in the direction in which the clip is inserted, whereby they may or may not be attached to said feet (4), depending on the embodiment, and whereby the clip has several wings (5) whose ends work against the lower surface of said panel and ensure the fastening of said clip (1) to said panel.

Figure 5:
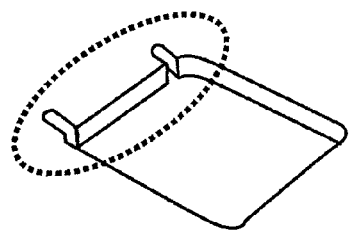
FIG. 5 shows, once the expansion of the airbag occurs, the impact of the so-called "knife effect" that damages the fastening panel of the clip.

In some of the known embodiments, such as that shown in FIG. 1, said wings (5) are fitted with flanges (6) as structural reinforcements, said flanges being the parts which work against the inner surface of the panel and which, as a result of the so-called "knife effect" (see FIG. 5), will damage said surface when the airbag fires.

Figure 2:
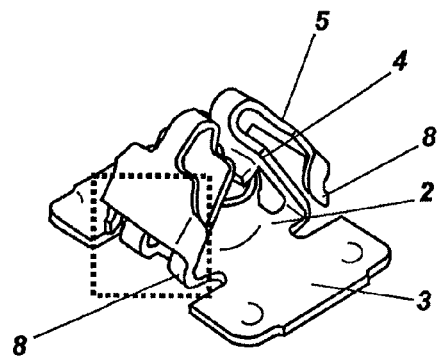
FIGS. 2, 3, and 4 depict, respectively, other known fastening clips that incur the above-described drawbacks and into which the improvements proposed by this invention can be incorporated.
Figure 3:
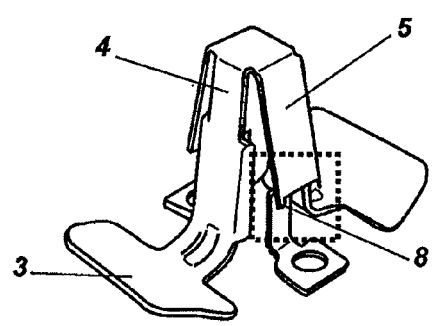
Figure 4:
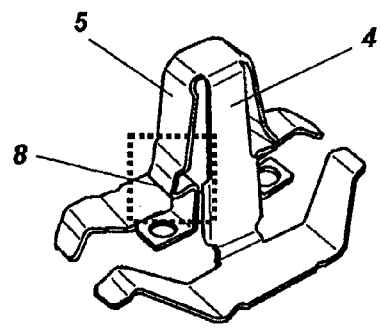

Owing to the improvements introduced by this invention, the ends of the wings (5) and/or, if applicable, of the flanges (6) have an "L"-shaped section profile that offers a larger contact surface (8) against the lower surface of the panel. In the state of the art, for example, as shown in FIGS. 1 and 2, the contact surface between the panel and the wings (5) is equivalent to the thickness of said wing (5). In the invention, the "L" profile (7) of the wings (5) represents an enlargement of the contact surface (8) of the wing (5) compared to the state of the art.

Since the tension or pressure that is responsible for the "knife effect" is inversely proportional to the mutual contact surface, this invention represents a substantial improvement that tends to eliminate this adverse effect. Moreover, it also helps reinforce the structural strength of the wing (5).

As mentioned previously, the force or thrust that the firing of the airbag applies to the clip parts is very large. This force, which tends to lift the clip (1) and pull it out of the panel, tends, in the known clips, to deform both the feet (4) and the wings (5). This force manifests itself as a bending the feet (4) at their base toward the center, which causes the clip parts to be mis-oriented relative to their proper working directions and relative to the surface against which they act.

In the known embodiment of FIG. 1, this force represents, on the one hand, a deformation or bending at the feet (4) at the origin of the flange (6), folding the feet inward. Another improper response on the part of this kind of known clip is characterized by a deformation of the wings (5) which in this embodiment are outside the feet (4), which are located in the interior, with respect to one another. This effect can be referred to as "planarity", in the sense that the edge closest to the working surface or lower surface of the panel of this flange (6) takes on a flat or parallel configuration relative to said surface, without maintaining its initial tilt consistent with the original mechanical elasticity or flexibility of the clip's feet (4).

To remedy these drawbacks, which cause the clip (1) to malfunction after the airbag is activated, the improvements offered by this invention call for several ribs (deformations, protrusions, bulges, etc.) whose purpose is to increase the structural rigidity of the feet (4) and wings (5) of the clip. In this way, in the embodiment depicted in FIGS. 9 and 10, the invention is fitted with ribs (9 and 10) in the feet and wings, respectively.

In this description, no effort has been made to describe the clip parts that are not relevant to the invention. Thus, and in accordance with the description given above, this invention is not oriented exclusively towards any one specific type of fastening clip; rather the improvements that are described can be used in any other kind of clip that has similar working functions.

Thus, for example, the embodiments depicted in FIGS. 11-13 and 14-16 represent general-purpose panel clips that incorporate the characteristics of this invention. Different embodiments of the airbag clip are shown in FIGS. 6-8 and 9-10.

Figure 11:
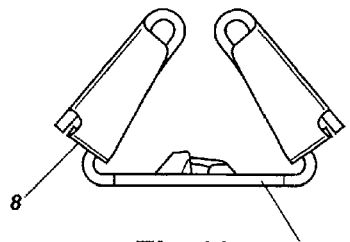
FIGS. 11-13 show different representations of another embodiment of the invention. They depict, respectively, a front view, a bottom perspective view, and a top perspective view. This embodiment uses a wing with a single thread for a fastening screw.
Figure 12:
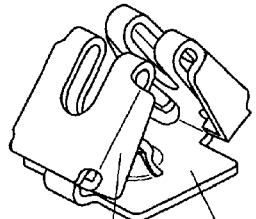
Figure 13:
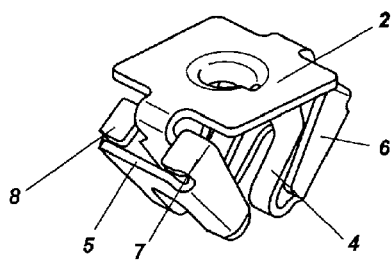

Specifically, the clip shown in FIGS. 11-13 consists of a panel clip (1) whose surface (2) has a hole for the passage of a screw, not shown, for fastening the clip to the panel. In this embodiment this hole is of a single-threaded type. From two opposing edges of this surface (2) emerges the set of feet (4), which are more or less elastic and which in their initial and undeformed position tend to converge on a central point, forming a "V" that is inverted and faces in the direction in which the clip is inserted. By bending said feet (4) backward and outward, wings (5) are provided whose outer sides have flanges (6) that terminate, by means of an "L"-shaped section fold, in a contact surface (8) against the lower part of the panel.

Figure 14:
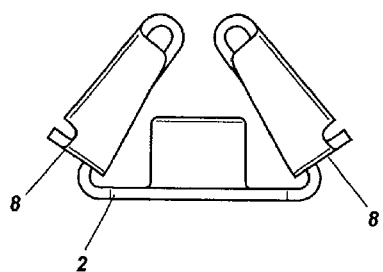
FIGS. 14-16 show different representations of another possible embodiment of the invention, with frontal, bottom perspective, and top perspective views, respectively. In this embodiment the panel clip uses a threaded tube for a fastening screw.
Figure 15:
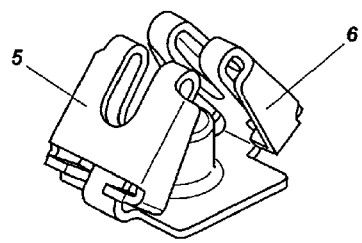
Figure 16:
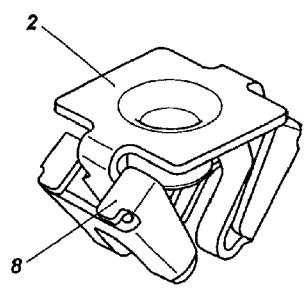

For its part, the embodiment shown in FIGS. 14-16 is similar to that described above, with the particular feature that the central hole for the passage of the clip's fastening screw is formed by a small barrel or cylinder that is threaded on the inside, i.e., with multiple threading.

Thus, other clips that are not mainly intended to be used to fasten airbags can take advantage of the improvements offered by this invention assuming that they have a similar working structure, as described in this document and in the practical embodiments shown.

It is understood that in this case there can be variations with regard to details of finishing and shape that do not alter the essence of the invention.

The invention claimed is:

1. A fastening clip to be fastened in an opening of a panel, said fastening clip comprising:
   a top member adapted to be located above the panel when the fastening clip is inserted into the opening of the panel; and
   a pair of elastic legs extending downwardly from the top member and converging toward lower ends of said legs for facilitating insertion of the legs into the opening of the panel;
   each said leg including
      an inner section, an outer section, and a bent section at the lower end of the leg and connecting the inner and outer sections,
      a pair of flanges, each of which is a portion of one of the inner and outer sections bent toward the other of the inner and outer sections along a first folding line that extends in a direction from the top member toward the lower end of said leg, and
      a pair of contact members adapted to engage a lower surface of the panel from below after the legs have been inserted into the opening of the panel to fasten the fastening clip to the panel;
   wherein
   each of the contact members is an upper portion of the corresponding flange bent along a second folding line that is transverse to the first folding line, and
   said contact members in each said leg extend toward each other in a direction transverse to both the first and second folding lines.

2. A fastening clip of claim 1, further comprising:
   a plurality of flexible arms extending from the top member for pressing an upper surface of the panel from above when the fastening clip is fastened to the panel.

3. A fastening clip of claim 1, further comprising:
   one or more of ribs, deformations, protrusions or bulges in said legs for enhancing structural rigidity of the legs.

4. A fastening clip of claim 3, wherein said one or more of ribs, deformations, protrusions or bulges are at the inner section in said legs for enhancing structural rigidity of the legs.

5. A fastening clip of claim 3, wherein said one or more of ribs, deformations, protrusions or bulges are at the outer section in said legs for enhancing structural rigidity of the legs.

6. A fastening clip of claim 1, further comprising:
   a hole extending through the top member for the passage of a fastening element.

7. A fastening clip of claim 6, wherein said hole has a single internal thread for threaded engagement with matching threads of the fastening element which is a screw.

8. A fastening clip of claim 6, wherein said hole is a cylindrical structure having multiple internal threads for threaded engagement with matching threads of the fastening element which is a screw.

9. A fastening clip of claim 1, wherein
   one of the inner section and the outer section in each said leg has side portions and spaced from each other in the direction in which said contact members in each said leg extend toward each other,
   the pair of flanges in each said leg is defined by the side portions, and
   each of the side portions is bent along the second folding line to define the corresponding contact member in each said leg.

10. A fastening clip of claim 9, wherein
    the inner section in each said leg has the side portions and spaced from each other in the direction in which said contact members in each said leg extend toward each other, the pair of flanges in each said leg is defined by the side portions of the inner section, and the side portions of the inner section in each said leg define the contact members.

11. A fastening clip to be fastened in an opening of a panel, said fastening clip comprising:
    a top member adapted to be located above the panel when the fastening clip is inserted into the opening of the panel; and
    a pair of elastic legs extending downwardly from the top member and converging toward lower ends of said legs for facilitating insertion of the legs into the opening of the panel;
    each said leg including
       an inner section, an outer section, and a bent section at the lower end of the leg and connecting the inner and outer sections,
       a flange which is a portion of one of the inner and outer sections bent toward the other of the inner and outer sections along a first folding line that extends in a direction from the top member toward the lower end of said leg, and
       a contact member adapted to engage a lower surface of the panel from below after the legs have been inserted into the opening of the panel to fasten the fastening clip to the panel;
    wherein
    the contact member is an upper portion of the flange bent along a second folding line that is transverse to the first folding line, and
    said contact member extends away from the second folding line in a direction transverse to both the first and second folding lines.

12. A fastening clip of claim 11, further comprising:
    a plurality of flexible arms extending from the top member for pressing an upper surface of the panel from above when the fastening clip is fastened to the panel.

13. A fastening clip of claim 11, further comprising:
    one or more of ribs, deformations, protrusions or bulges in said legs for enhancing structural rigidity of the legs.

* * * * *